(12) United States Patent
Bessegato et al.

(10) Patent No.: US 10,505,378 B2
(45) Date of Patent: Dec. 10, 2019

(54) ENSURING BACKWARD COMPATIBILITY IN BATTERY AUTHENTICATION APPLICATIONS

(71) Applicant: Infineon Technologies AG, Neubiberg (DE)

(72) Inventors: Renato Bessegato, Oberhaching (DE); Mohit Berry, Munich (DE); Yiming Tang, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 528 days.

(21) Appl. No.: 15/199,237

(22) Filed: Jun. 30, 2016

(65) Prior Publication Data

US 2018/0006473 A1 Jan. 4, 2018

(51) Int. Cl.
H02J 7/00 (2006.01)

(52) U.S. Cl.
CPC ............ H02J 7/0026 (2013.01); H02J 7/007 (2013.01); *H02J 2007/0001* (2013.01)

(58) Field of Classification Search
CPC ... H02J 7/0026; H02J 7/007; H02J 2007/0001
See application file for complete search history.

(56) References Cited

U.S. PATENT DOCUMENTS

| | | | |
|---|---|---|---|
| 2007/0123316 A1* | 5/2007 | Little | G06F 21/31 455/573 |
| 2009/0088992 A1 | 4/2009 | Matsumura et al. | |
| 2009/0256717 A1* | 10/2009 | Iwai | G06F 1/26 340/5.8 |
| 2010/0223476 A1* | 9/2010 | Maletsky | H01M 10/4257 713/189 |
| 2011/0270480 A1* | 11/2011 | Ishibashi | B60L 11/1824 701/22 |
| 2012/0049785 A1* | 3/2012 | Tanaka | B60L 3/0046 320/106 |

(Continued)

FOREIGN PATENT DOCUMENTS

| | | |
|---|---|---|
| CN | 102255109 A | 11/2011 |
| DE | 102011081688 A1 | 3/2012 |

(Continued)

*Primary Examiner* — Khoi V Le
(74) *Attorney, Agent, or Firm* — Shumaker & Sieffert, P.A.

(57) ABSTRACT

A system and method to identify whether a removable battery pack inserted into a battery-powered device is an authorized battery pack for the device. Battery-powered devices may include a battery-powered drill, saw, flashlight or other type of device. The battery-powered device may send an authentication query to the battery pack. If the battery-powered device does not receive a valid reply from the battery pack, the battery-powered device may verify that the battery-powered device is still within a phase-out period that allows the battery-powered device to use a battery pack with an invalid authentication. If the phase-out period has expired, the battery-powered device may disable the use of the battery pack with an invalid authentication. If the phase-out period is still running, the battery-powered device may allow the use of the battery pack with an invalid authentication, but only for a limited number of battery pack recharge cycles.

21 Claims, 4 Drawing Sheets

(56) References Cited

U.S. PATENT DOCUMENTS

| | | |
|---|---|---|
| 2012/0050054 A1 | 3/2012 | Fujiwara |
| 2012/0235628 A1* | 9/2012 | Okabayashi ............ H02J 7/00 320/106 |
| 2012/0284514 A1* | 11/2012 | Lambert ............... H04L 9/3263 713/168 |
| 2013/0069661 A1* | 3/2013 | Rich .................... H01M 10/42 324/433 |
| 2014/0181167 A1 | 6/2014 | Noda |
| 2014/0346982 A1 | 11/2014 | Brochhaus |
| 2015/0189177 A1 | 7/2015 | Matsushima et al. |
| 2015/0207185 A1 | 7/2015 | Kono |
| 2015/0358214 A1* | 12/2015 | Toya ...................... H04L 41/50 709/223 |
| 2016/0294206 A1* | 10/2016 | Okawa ................. H02J 7/0004 |

FOREIGN PATENT DOCUMENTS

| | | |
|---|---|---|
| DE | 102013021805 A1 | 6/2014 |
| DE | 102014019267 A1 | 7/2015 |
| EP | 2571076 A1 | 3/2013 |
| EP | 2571077 A1 | 3/2013 |
| EP | 2571131 A1 | 3/2013 |
| JP | 2012222945 A | 11/2012 |
| WO | 2011120974 A1 | 10/2011 |

\* cited by examiner

ENSURING BACKWARD COMPATIBILITY IN BATTERY AUTHENTICATION APPLICATIONS

TECHNICAL FIELD

The disclosure relates to authentication of removable batteries used by battery-powered devices.

BACKGROUND

There are a wide variety of portable, battery-powered systems that use replaceable or rechargeable battery packs. Batteries, such as lithium-ion batteries, designed by original equipment manufacturers (OEM), may provide optimal end-user experience in terms of performance and safety. However, there are also low quality battery manufacturers building replacement battery packs for some battery-powered systems. These low-quality, counterfeit battery packs may pose risk to the end-user and may risk damage to the device or to the end-user. For example, a low-quality battery may explode or overheat and cause a fire. Low-quality batteries may also cause damage to the device if they do not have the correct voltage characteristics or built-in safety features, such as fuses and thermal or over-current protection. Low-quality batteries may be built with lower quality manufacturing techniques and less stringent manufacturing standards. To differentiate from the low quality components/batteries, OEMs may implement simple techniques to verify a battery pack is authorized for use with a battery-powered system. With time, low-quality manufacturers may hack the solutions and copy the authentication techniques. This may result in the system again becoming vulnerable.

An OEM may be reluctant to shift to better and more robust authentication solution because the solution may not be backward compatible to previous batteries. An end-user may get annoyed by not being able to use their older batteries with a recently purchased tool that may include a more robust authentication solution. An authentication solution that allows more robust authentication while still allowing an end-user to use their older batteries may have advantages in safety and performance of battery-powered devices.

SUMMARY

In general, this disclosure is directed to a system and method for robust authentication of battery packs used with battery-powered devices. The method may include techniques that may easily phase-out, over time, older components with less robust security as well as counterfeit components. This authentication solution may have the effect of incorporating a robust, high level of authentication without annoying an end-user or, in some examples, without the end-user noticing the change.

In one example, the disclosure is directed to a method comprising: sending, by a processor of a battery-powered device, an inquiry message to a removable battery pack coupled to the battery-powered device, wherein the removable battery pack comprises a battery power cell and at least one authentication component; waiting, by the processor, for a predetermined time to receive a reply from the at least one authentication component; in response to receiving the reply from the at least one authentication component, determining, by the processor, whether the reply from the at least one authentication component is a valid reply; in response to determining, by the processor, that the reply from the at least one authentication component is a valid reply, enabling, by the processor, the operation of the battery-powered device; in response to determining, by the processor, that the reply from the at least one authentication component is an invalid reply, determining, by the processor, whether a phase-out period for the removable battery pack has expired; and in response to determining that the phase-out period for the removable battery pack has expired, disabling, by the processor, the operation of the battery-powered device.

In another example, the disclosure is directed to a system comprising, a battery-powered device, wherein the battery-powered device includes an operational component and at least one processor; a removable battery pack, wherein the removable battery pack includes at least one battery cell and at least one authentication component; and wherein the processor is configured to: send an inquiry message to the at least one authentication component; wait for a predetermined time to receive the reply from the at least one authentication component; in response to receiving the reply from the at least one authentication component, determine whether the reply is a valid reply; in response to determining that the reply is a valid reply, enable the operation of the battery-powered device; in response to determining that the reply from the at least one authentication component is an invalid reply, determine whether a phase-out period for the removable battery pack has expired; and in response to determining that the phase-out period for the removable battery pack has expired disable the operation of the battery-powered device.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes various techniques to identify whether a removable battery pack inserted into a battery-powered device is an authorized battery pack for the device. A battery-powered device, in accordance with techniques of this disclosure, may communicate with a removable battery pack inserted in the device to determine whether the battery pack is an authorized battery pack designed for use in the battery-powered device. Battery-powered devices may include a battery-powered drill, saw, flashlight, cordless vacuum cleaner or other type of device. The battery-powered device may send an authentication query to the battery pack. If the battery-powered device does not receive a valid reply from the battery pack, the battery-powered device may determine the battery pack is an unauthorized or invalid battery pack. If the battery-powered device determines the battery pack is an invalid battery pack, the battery-powered device may verify that the battery-powered device is still within a phase-out period. A phase-out period may allow the battery-powered device to use an invalid battery pack with an invalid authentication. If the phase-out period has expired, the battery-powered device may disable the use of the invalid battery pack. If the phase-out period is still running, the battery-powered device may allow the use of the battery pack with an invalid authentication, but only for a limited number of battery pack recharge cycles.

Many battery packs have a limited number of useful recharge cycles. For example, nickel-cadmium (NiCad) and lithium-ion batteries performance may diminish over time and many recharge cycles and therefore may have a limited useful life. Eventually an end-user may need to replace an older battery pack because the battery pack may only operate the device for a short period, or deliver insufficient performance. Battery-powered devices, in accordance with techniques of this disclosure, may select a phase-out period and a recharge cycle threshold that may allow the use of an older battery pack with an invalid authorization for approximately the useful life of the older battery pack. In this way the authentication solution in accordance with this disclosure may have the effect of incorporating a robust, high level of authentication without annoying an end-user or, in some examples, without the end-user noticing the change.

Figure 1:
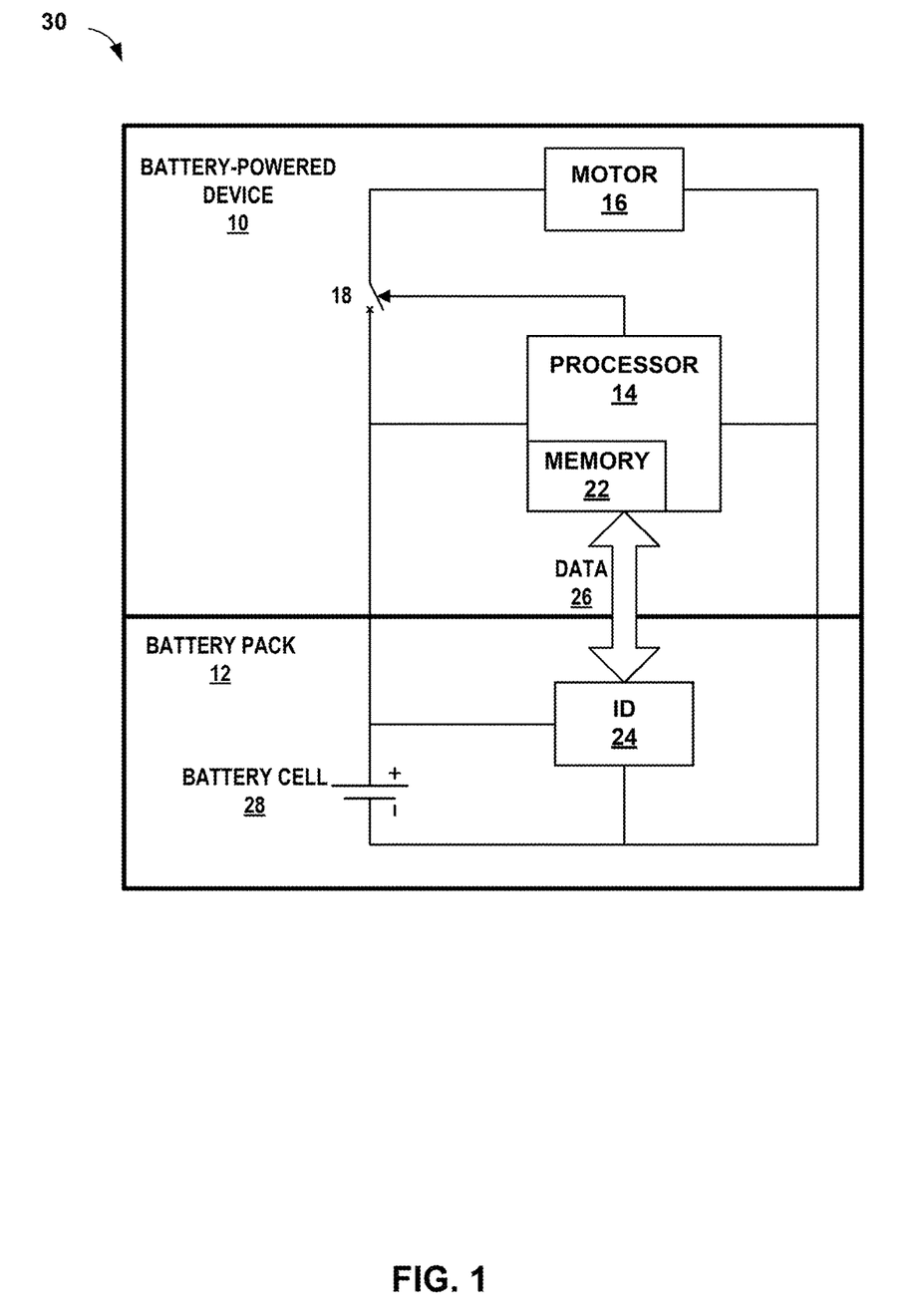
FIG. 1 is a conceptual and schematic block diagram illustrating a battery-powered system comprising a battery-powered device and a removable battery pack.

FIG. 1 is a conceptual and schematic block diagram illustrating a battery-powered system comprising a battery-powered device and a removable battery pack. FIG. 1 illustrates battery-powered system 30, which may include battery-powered device 10 and battery pack 12. Battery-powered device 10 may include an operational component, such as motor 16, one or more processors 14 that may be communicatively coupled to a data storage device, such as memory 22. Processor 14 may control the operation of motor 16 by controlling switch 18 and may communicate with battery pack 12, or other devices through data connection 26. Battery pack 12 may include one or more battery cells 28 and one or more authentication components, such as ID component 24.

Battery-powered system 30 may be any system that operates with a removable battery pack. Some examples of battery-powered system 30 may include FM radio, compact disc (CD) player, portable computer, a cordless vacuum cleaner, and cordless power tools such as a hand-held drill, circular saw, orbital sander or other similar system.

Battery-powered device 10 may be an older generation device with little or no battery pack authentication ability or a device with a robust authentication capability. FIG. 1 depicts example battery-powered device 10 as a device with a robust authentication capability that includes backward compatibility for older generation battery packs. Battery-powered device 10 may include power connections to receive electrical energy from battery pack 12 as well as data connection 26 to communicate with battery pack 12, or other devices.

Data connection 26 may include a universal serial bus (USB), a single wire bidirectional bus or other connection to communicate with a computer. Through this connection battery-powered device 10 may receive updates, such as updated firmware or data, and may communicate status to an application or to the manufacturer. Manufacturers may request an end-user register their device with the manufacturer or distributor for warranty or safety recall purposes. In another example, a manufacturer may establish a predetermined phase-out period of 18 months. After some experience with battery-powered systems 30 in the hands of end-users, a manufacturer may determine that the phase-out period should be longer or shorter. Data connection 26 may provide an avenue to update the phase-out period for battery-powered systems 30 in possession and in use by end-users and may improve the end-user experience. Other examples of data connections 26 may include any one or more wireless techniques. Some examples of wireless communication techniques may include inductive communication, Bluetooth, ANT, ANT+, Wi-Fi or similar communication techniques.

Battery-powered device 10 may include one or more processors 14. Processor 14 may perform a variety of functions including battery authentication. Processor 14 may receive power from battery pack 12 through the power connections. Processor 14 may also have an independent power source within battery-powered device 10 for low-power standby operation (not shown in FIG. 1). In one example, processor 14 may include low-power background operations, such as a clock or timer, when not connected to battery pack 12. Processor 14 may communicate through data connection 26 to battery pack 12, or other devices. Processor 14 may monitor and control various functions within battery-powered device 10 including controlling switch 18. Switch 18 is one example technique to enable or disable the electrical energy from battery pack 12 to motor 16. Other techniques to enable or disable the operation of motor 16 also fall within the scope of this disclosure. Examples of processor 14 may include any one or more of a microprocessor, a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Processor 14 may be communicatively coupled to memory 22. Memory 22 may be any data storage device configured to store and retrieve data. In some examples memory 22 may be integrated as part of processor 14, as depicted by FIG. 1. In other examples, memory 22 may be a separate component communicatively coupled to processor 14. Information and data stored at memory 14 may include applications, functions or data that processor 14 may use to monitor and control battery-powered device 10. Some examples of data that may be stored at memory 11 may include a database of valid battery ID numbers, a database of phase-out periods as well as one or more authentication keys. Examples of memory 22 may be may be random access memory (RAM), dynamic RAM (DRAM), other forms of DRAM such as synchronous DRAM (SDRAM), double data rate SDRAM (e.g. DDR1 SDRAM, DDR2 SDRAM etc.), and non-volatile memory (NVM), like FLASH, EEPROM and similar. Memory 22 may be implemented as one or more external memory modules connected as a bank of memory and accessible by processor 14. Processor 14 may store information at memory 22 for use in performing operations on behalf of battery-powered system 30.

Example battery-powered device 10 includes motor 16, as depicted by FIG. 1. Motor 16 may receive electrical energy from battery pack 12 through switch 18 when enabled by processor 14. Motor 16 may provide mechanical energy for a variety of functions including a drill, powered screwdriver, circular saw, belt sander, vacuum cleaner, powered scissors or similar functions. The example of FIG. 1 depicts motor 16 as an electric motor, however, in other examples, motor 16 may be any electrically powered operational component. Some non-motor examples of operational components may include a portable computer, an FM radio or other radio, two-way communication device, lighting, camera, portable scientific equipment and other similar components.

Battery pack 12 may be any type of removable single use or rechargeable device that may be used to provide electrical energy to battery-powered device 10. Battery pack 12 may also be called a battery cartridge or battery module. Battery pack 12 may include one or more battery cells 28 that store and provide electrical energy to battery-powered device 10. In some examples, battery cells 28 may be a custom shape to fit into battery pack 12. In other examples, battery cells 28 may be a standard form factor, such as a cylinder. One or more standard form factor battery cells 28 may connect in series and/or parallel and be configured to fit within battery pack 12. Battery cells 28 may be any of a variety of battery chemistries. Some non-limiting examples may include alkaline, nickel-cadmium (NiCd), nickel-metal-hydride (NiMH), lithium-ion or other types of electrical energy storage cells. In examples of battery pack 12 that include rechargeable battery cells 28, battery pack 12 may also include a charge monitoring circuit (not shown in FIG. 1) to prevent overheating during charging and to prevent long or short-term damage to battery cells 28 from overcharging.

Battery pack 12 may include one or more authentication components, such as ID component 24. ID component 24 may be a simple authentication component that may provide only an identification number, or a certain electrical characteristic value. For example, ID component 24 may be a data storage device including a battery ID number. ID component 24 may also be implemented as one or more trimmable resistors that return a resistance value corresponding to a battery ID number. In other examples, ID component 24 may return a value of an electrical characteristic, such as an impedance value or capacitance value. A database of valid electrical characteristics may be stored at memory 22 in battery-powered device 10 to authenticate battery pack 12 to battery-powered device 10. Other examples of ID component 24 may include a more robust authentication component. Some examples of a more robust authentication component may include a microcontroller, a state machine, microprocessor or other similar component. In some examples, ID component 24 may conduct one or more exchanges of information with processor 14 through data connection 26. The one or more exchanges may include various encryption and authentication key algorithms to provide a robust authentication solution that is difficult for low-quality battery manufacturers to hack or duplicate.

A battery-powered system in accordance with the techniques of this disclosure may enable the operation of battery-powered device 10 by using a robust authentication solution. Additionally, battery-powered system in accordance with the techniques of this disclosure may enable the operation of battery-powered device 10 for a limited time, such as a phase-out period, for battery packs that are unable to use a robust authentication solution.

Figure 2:
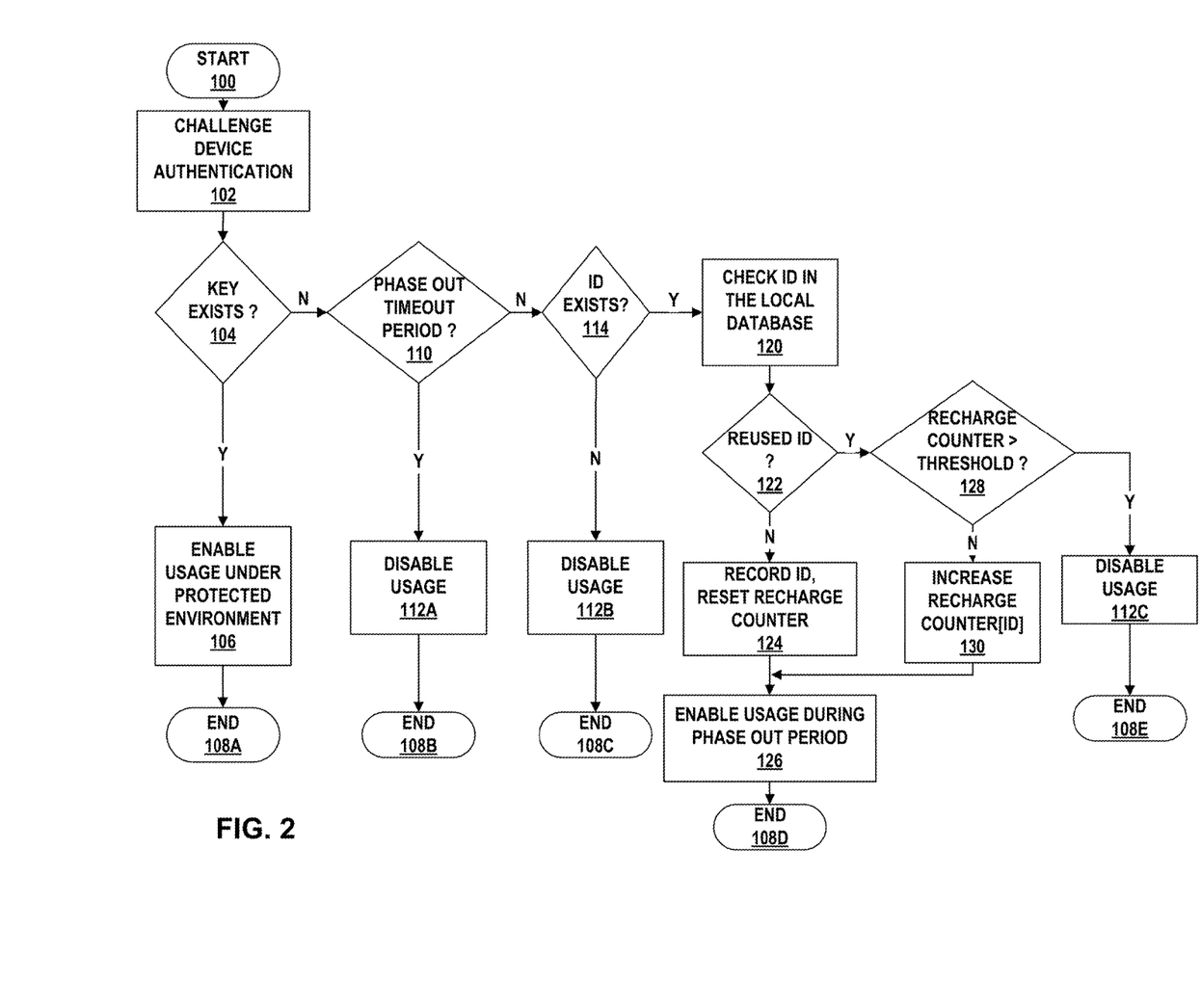
FIG. 2 is a process flow diagram illustrating an example robust authentication solution with backwards compatibility, in accordance with one or more techniques of this disclosure.

FIG. 2 is a process flow diagram illustrating an example robust authentication solution with backwards compatibility, in accordance with one or more techniques of this disclosure. The robust authentication solution with backwards compatibility may be implemented on any of the example battery-powered systems discussed above. The process flow diagram of FIG. 2 will be described in terms of system 30 shown in FIG. 1.

The authentication process may start (100) when battery-powered device 10 connects to battery pack 12. Processor 14 may start up, or wake up, from a standby, sleep or power off states and challenge the device authentication (102) by sending an inquiry message to at least one authentication component, e.g. ID component 24 in removable battery pack 12. Processor 14 may wait for a predetermined time to receive a reply from the at least one authentication component. The inquiry message may be any one of a variety of robust authentication protocols including a multi-message query and response protocol, a protocol using encryption techniques or other authentication techniques. In the example of FIG. 2, processor 14 may verify an authentication key exists (104) in the reply from ID component 24. In other words, in response to receiving the reply from the at least one authentication component, processor 14 may determine whether the reply from the at least one authentication component is a valid reply.

In response to processor 14 determining that the reply from the ID component 24 includes a correct authentication key, i.e. the reply is a valid reply (104), processor 14 may enable the operation of battery-powered device 10 (106). This process may enable operation under a protected environment where battery-powered device 10 only operates with batteries authenticated as safe and able to meet performance standards (106). Processor 14 may end the authentication process (108A) and continue to monitor or control other functions of battery-powered system 30. For example, processor 14 may monitor the charge level of battery pack 12 and display an indication of the charge level. In some examples the indication of charge level may include one or more light-emitting diodes (LEDs).

Processor 14 may determine that the reply from the at least one authentication component is an invalid reply. For example, if battery pack 12 is an older battery pack with a less sophisticated authentication component, processor 14 may receive an invalid reply. The invalid reply may include no reply to the inquiry message. In other examples, a less sophisticated ID component 24 may reply with an older version of an authentication key. In response to an invalid reply, processor 14 may determine whether a phase-out period for the removable battery has expired (110). A manufacturer of a battery-powered system 30 may determine one or more phase-out periods for components of the system. In some examples, a phase-out period may include predetermined end date, e.g. 15 Apr. 2019 or may be associated with an ID number of a particular battery pack. A phase-out period may be determined based on the length of useful life of a component, or based on some other criteria determined by the manufacturer. Phase-out periods may be stored at memory 22 in a database, or calculated by processor 14 based on an application or function.

In response to determining that the phase-out period for the removable battery has expired (110), processor 14 may disable the operation of battery-powered device 10 (112A). For example, processor 14 may open switch 18 to prevent electrical energy from battery pack 12 from reaching motor 16. Processor 14 may display some indication to the user that the battery is invalid and end the authentication process (108B). For example, processor 14 may flash a predetermined sequence on an LED, display a message on a display communicatively coupled to processor 14, or transmit a wireless message through data connections 26 to an external device.

Processor 14 may determine that the phase-out period for the removable battery has not expired (110). Processor 14 may determine whether the removable battery includes at least one ID component (114). Processor 14 may determine the at least one ID component, such as ID component 24, contains a battery ID number associated with the removable battery. In this example, ID component 24 may be a component in an older, but valid, battery pack 12. However, if processor 14 determines that removable battery pack does not have at least one ID component, processor 14 may disable the operation of battery-powered device 10 (112B). Processor 14 may display some indication to the user that the battery is invalid and end the authentication process (108C).

Processor 14 may determine that the phase-out period for the removable battery has not expired (110) and the removable battery includes at least one ID component (114). Processor 14 may verify the battery ID number against a plurality of battery ID numbers in a database stored at a data storage device communicatively coupled to processor 14, such as memory 22 (120). Processor 14 may determine whether the battery ID number associated with the removable battery pack is a reused battery ID number (122).

In response to determining that the battery ID number is not a reused battery ID number, processor 14 may record the battery ID number at memory 22 and associate a battery recharge counter to the battery ID number (124). Processor 14 may set, or reset, the battery recharge counter associated with the battery ID number to zero, for example, or to a number equaling a maximum number of recharge cycles (124). As long as the phase-out period has not expired, processor 14 may enable the operation of the battery-powered device (126) and end the authentication process (108D).

Processor 14 may determine that the battery ID number is a reused battery ID number (122). In response to determining that the battery ID number is a reused battery ID number, processor 14 may determine whether the battery recharge counter associated with the battery ID number has exceeded a battery recharge counter threshold associated with the battery ID number (128). For example, a battery pack manufacturer may determine the maximum number of recharge cycles during the useful life of battery pack 12 is fifty-five. The battery-powered system manufacturer may then set a maximum recharge counter threshold associated with a set of battery ID numbers to be fifty-five.

In response to processor 14 determining that the battery recharge counter associated with the battery ID number has not exceeded the battery recharge counter threshold, processor 14 may increment the battery recharge counter associated with the battery ID number (130). In other examples, processor 14 may set the battery recharge counter to a maximum recharge counter threshold. Processor 14 may decrement, or increment in a negative direction, the battery recharge counter associated with the battery ID number. In this example, the battery recharge counter threshold may be zero, or some other value less than the maximum recharge counter threshold. Processor 14 may decrement the battery recharge counter until the battery recharge counter reaches zero, or some other predetermined value. While the phase-out period has not expired (110), and the battery recharge counter has not reached the recharge counter threshold (128), processor 14 may enable the operation of the battery-powered device (126) and end the authentication process (108D). In response to processor 14 determining that the battery recharge counter associated with the battery ID number exceeds the recharge counter threshold (128) associated with the battery ID number, processor 14 may disable the operation of the battery-powered device (112C) and end the authentication process (108E).

In operation, the authentication solution in FIG. 2 may provide both advantages in safety and performance for the end-user without creating annoyance and frustration. For example, an end-user may purchase a battery-powered system, such as a cordless circular saw. The circular saw may include a less robust authentication solution that may depend on a battery ID number to authenticate a valid battery pack. Sometime later, the end-user may purchase an additional battery-powered system using the same type of battery pack. For example, the end-user may purchase a cordless vacuum to clean up after using the cordless circular saw. The end-user may expect that the end-user may interchange the batteries between the circular saw and vacuum as needed. An end-user who found that the older battery pack would not work in the new vacuum may get annoyed and frustrated. However, battery-powered systems in accordance with the techniques of this disclosure would allow the older battery pack to work in the new vacuum during a phase-out period. The phase-out period may be set to the useful life of the older battery pack. When the older battery pack reaches the end of useful life, also the end of the phase-out period, the end-user may have to replace the battery pack anyway to maintain performance. At the same time, the authentication solution, in accordance with this disclosure, may protect the end-user from using low-quality batteries without the correct authentication. Using authenticated battery packs may result in superior performance and safety.

Figure 3:
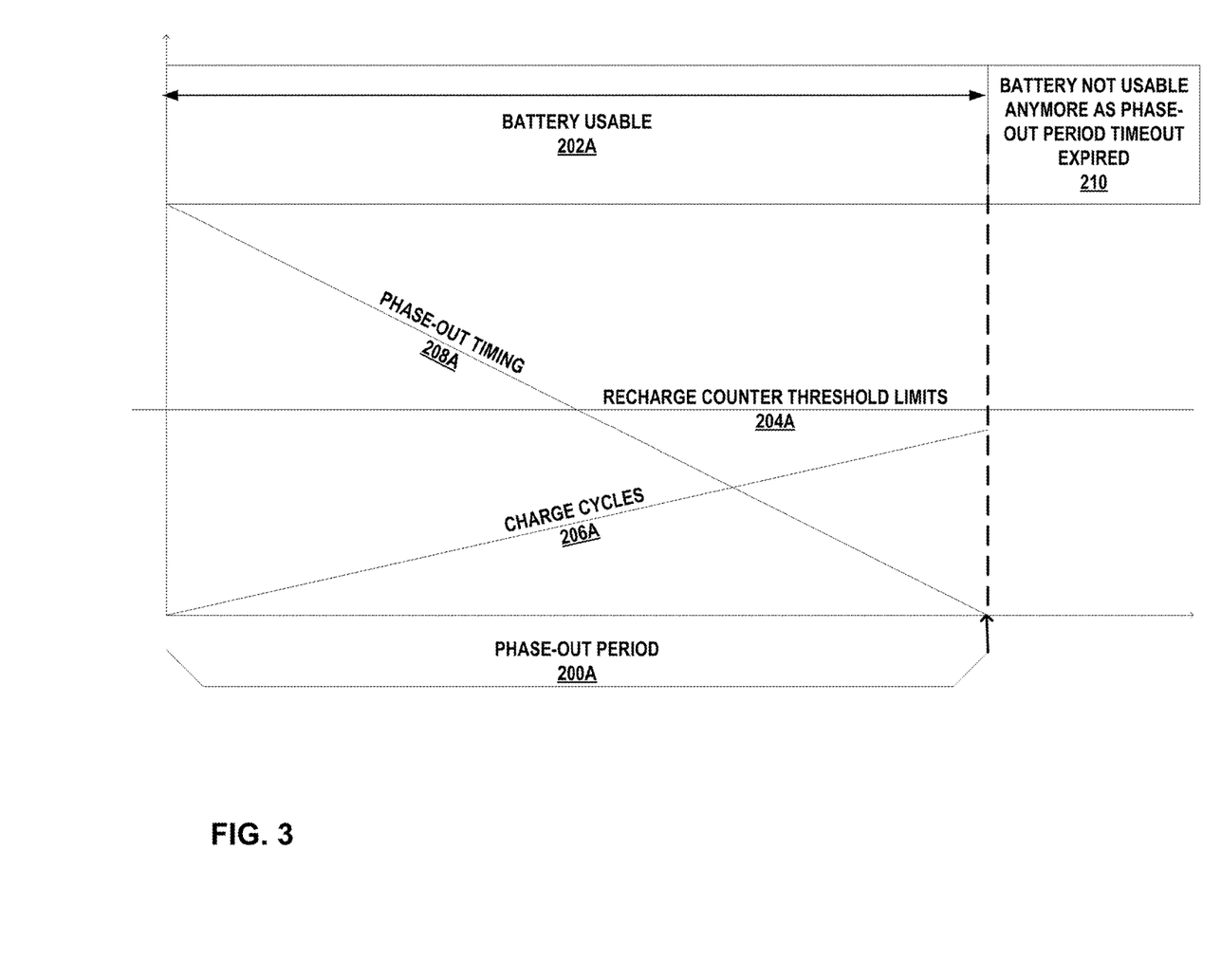
FIG. 3 is a graph illustrating an example operation of a battery authentication solution using a phase-out period, in accordance with one or more techniques of this disclosure.

FIG. 3 is a graph illustrating an example operation of a battery authentication solution using a phase-out period, in accordance with one or more techniques of this disclosure. The example graph of FIG. 3 will be described in the context of the block diagram of FIG. 1 and process flow diagram of FIG. 2.

FIG. 3 illustrates a battery usable period 202A over a phase-out period 200A, a phase-out timing 208A, recharge counter threshold limit 204A and a battery recharge counter cycle counter 206A along with the period 210 where the phase-out period expired and the battery pack may no longer be usable. FIG. 3 illustrates the example of the phase-out period expiring before the recharge cycles exceed the recharge cycle threshold. Charge cycle and recharge cycle, as well as charging and recharging may be used interchangeably in this disclosure.

The example of FIG. 3 depicts recharge counter threshold limit 204A as a maximum value. Processor 14 may increment the battery recharge cycle counter 206A associated with the battery ID number after each recharge cycle, and enable the operation of the battery-powered device 30 during phase-out period 200A. In other examples not shown in FIG. 3, processor 14 may set battery recharge charge cycle counter 206A to a maximum recharge cycle value. Processor 14 may decrement battery recharge charge cycle counter 206A after each recharge cycle until recharge charge cycle counter 206A reaches a lower limit.

Phase-out timing 208A decreases over phase-out period 200A until phase-out timing 208A expires indicating the end of phase-out period 200A. This is also the end of battery usable period 202A. During the period 210 when the battery is no longer usable, processor 14 may disable the operation (112A) of battery-powered device 10. Processor 14 may also display some indication to the end-user that the battery is no longer usable. For example, processor 14 may flash a predetermined sequence on an LED, display a message on a display communicatively coupled to processor 14, or transmit a wireless message through data connections 26 to an external device. In one example, a battery-operated camera may include a display communicatively coupled to processor 14 that may be used to display camera mode, lens aperture and other information. The camera display may also indicate to the end-user that the battery is no longer usable.

Figure 4:
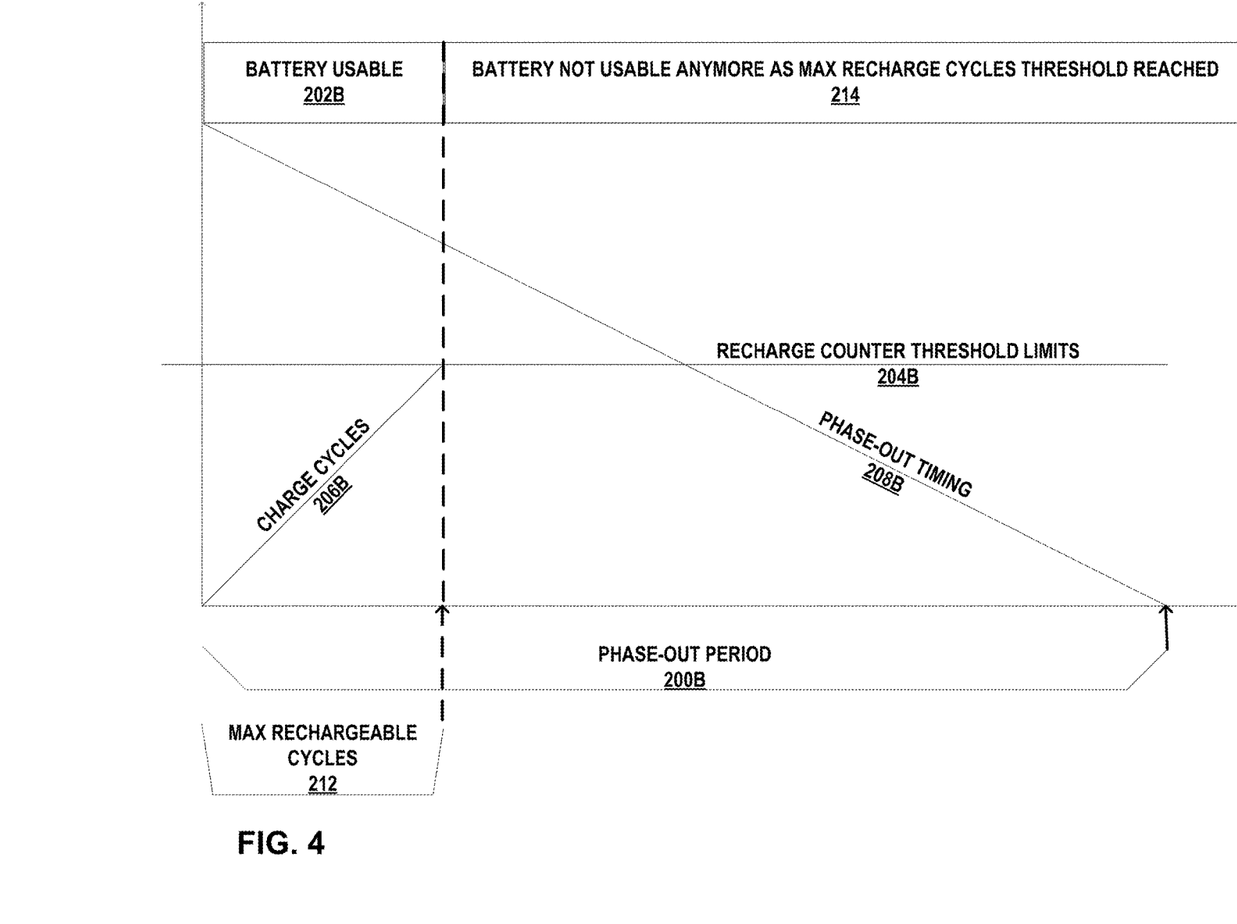
FIG. 4 is a graph illustrating an example operation of a battery authentication solution using a maximum recharge cycle threshold along with a phase-out period, in accordance with one or more techniques of this disclosure.

FIG. 4 is a graph illustrating an example operation of a battery authentication solution using a maximum recharge cycle threshold along with a phase-out period. The example graph of FIG. 4 will be described in the context of the block diagram of FIG. 1 and process flow diagram of FIG. 2.

FIG. 4 illustrates a battery usable period 202B over a maximum recharge cycle period 212, a phase-out timing 208B, phase-out period 200B, recharge counter threshold limit 204B and a charge cycle counter 206B along with the period 214 where the battery pack exceeded the charge cycle counter threshold and the battery pack may no longer be usable. FIG. 4 illustrates the example of the charge cycles exceeding the charge cycle threshold before the phase-out period expired.

FIG. 4 depicts phase-out timing 208B decreases over phase-out period 200B until phase-out timing 208B would expire indicating the end of phase-out period 200B. However, in this example, battery pack 12 may exceed the recharge counter threshold limit 204B associated with the battery ID number for battery pack 12 while still within phase-out period 200B.

In the example of FIG. 4, processor 14 may increment battery recharge cycle counter 206B after each recharge cycle. As shown, battery recharge cycle counter 206B may increase until it reaches recharge counter threshold limit 204B. While battery recharge cycle counter 206B is less than recharge counter threshold limit 204B, processor 14 may enable the operation of battery-powered device 10 (126) because, as shown battery pack 12 may still be within phase-out period 200B. Once battery recharge cycle counter 206B exceeds recharge counter threshold limit 204B, processor 14 may disable the operation of battery-powered device 10 (112C).

In this way a battery-powered system may use a robust authentication solution to protect an end-user from using low-quality batteries, which may result in superior performance and safety. The addition of a of a phase-out period and a recharge cycle counter may have the effect of incorporating a robust, high level of authentication without annoying an end-user or in some examples, without the end-user noticing the more robust authentication. A phase-out period and recharge counter threshold limit may be set to the useful life of a removable battery pack. When the older battery pack reaches the end of useful life the end-user may have to replace the battery anyway to maintain performance.

Example 1

A method comprising: sending, by a processor of a battery-powered device, an inquiry message to a removable battery pack coupled to the battery-powered device, wherein the removable battery pack comprises a battery power cell and at least one authentication component; waiting, by the processor, for a predetermined time to receive a reply from the at least one authentication component; in response to receiving the reply from the at least one authentication component, determining, by the processor, whether the reply from the at least one authentication component is a valid reply; in response to determining, by the processor, that the reply from the at least one authentication component is a valid reply, enabling, by the processor, the operation of the battery-powered device; in response to determining, by the processor, that the reply from the at least one authentication component is an invalid reply, determining, by the processor, whether a phase-out period for the removable battery pack has expired; and in response to determining that the phase-out period for the removable battery pack has expired, disabling, by the processor, the operation of the battery-powered device.

Example 2

The method of example 1, wherein the invalid reply includes no reply from the at least one authentication component Example 3

The method of any of examples 1-2 wherein, determining, by the processor, that the reply from the at least one authentication component is a valid reply comprises determining the at least one authentication component replies using a valid authentication key.

Example 4

The method of any of examples 1-3, further comprising in response to determining that the phase-out period for the removable battery pack has not expired: determining, by the processor, whether the removable battery pack comprises at least one identification (ID) component, wherein the at least one ID component contains a battery ID number associated with the removable battery pack; and in response to determining that the removable battery pack does not have at least one ID component, disabling, by the processor, the operation of the battery-powered device.

Example 5

The method of example 4, further comprising in response to determining that the removable battery pack has at least one ID component: determining, by the processor, whether the battery ID number associated with the removable battery pack is a reused battery ID number, wherein determining whether the battery ID number associated with the removable battery pack is a reused battery ID number includes verifying the battery ID number against a plurality of battery ID numbers in a database stored at a data storage device communicatively coupled to the processor; in response to determining, by the processor, that the battery ID number is not a reused battery ID number: recording, by the processor, the battery ID number at the data storage device; associating, by the processor, a battery recharge counter to the battery ID number; and enabling, by the processor, the operation of the battery-powered device.

Example 6

The method of example 5, further comprising in response to determining that the battery ID number is a reused battery ID number: determining, by the processor, whether the battery recharge counter associated with the battery ID number has exceeded a battery recharge counter threshold associated with the battery ID number; in response to determining, by the processor, that the battery recharge counter associated with the battery ID number has not exceeded the battery recharge counter threshold associated with the battery ID number: incrementing, by the processor, the battery recharge counter associated with the battery ID number; and enabling, by the processor, the operation of the battery-powered device; and in response to determining, by the processor, that the battery recharge counter associated with the battery ID number exceeds the recharge counter threshold associated with the battery ID number disabling, by the processor, the operation of the battery-powered device.

Example 7

The method of example 6, wherein the recharge counter threshold is zero and in response to determining, by the processor, that the battery recharge counter associated with the battery ID number has not reached the battery recharge counter threshold, decrease the the battery recharge counter from a maximum number of recharge counts.

Example 8

A system comprising, a battery-powered device, wherein the battery-powered device includes an operational component and at least one processor; a removable battery pack, wherein the removable battery pack includes at least one battery cell and at least one authentication component; and wherein the processor is configured to: send an inquiry message to the at least one authentication component; wait for a predetermined time to receive the reply from the at least one authentication component; in response to receiving the reply from the at least one authentication component, determine whether the reply is a valid reply; in response to determining that the reply is a valid reply, enable the operation of the battery-powered device; in response to determining that the reply from the at least one authentication component is an invalid reply, determine whether a phase-out period for the removable battery pack has expired; and in response to determining that the phase-out period for the removable battery pack has expired disable the operation of the battery-powered device.

Example 9

The system of example 8, wherein the invalid reply includes no reply from the at least one authentication component.

Example 10

The system of any of examples 8-9 wherein, determining, by the processor, that the reply from the at least one authentication component is a valid reply comprises determining the at least one authentication component replies using a valid authentication key.

Example 11

The system of any of examples 8-10, wherein the processor is further configured to: in response to determining that the phase-out period for the removable battery pack has not expired determine whether the removable battery pack comprises at least one identification (ID) component, wherein the at least one ID component contains a battery ID number associated with the removable battery pack; and in response to determining that the removable battery pack does not have at least one ID component, disabling, by the processor, the operation of the battery-powered device.

Example 12

The system of example 11, wherein the processor is further configured to, in response to determining that the removable battery pack has at least one ID component: determine whether the battery ID number associated with the removable battery pack is a reused battery ID number, wherein determining whether the battery ID number associated with the removable battery pack is a reused battery ID number includes verifying the battery ID number against a plurality of battery ID numbers in a database stored at a data storage device communicatively coupled to the processor; in response to determining that the battery ID number is not a reused battery ID number: record the battery ID number at the data storage device; associate a battery recharge counter to the battery ID number; and enable the operation of the battery-powered device.

Example 13

The system of example 12, further comprising in response to determining that the battery ID number is a reused battery ID number: determine whether the battery recharge counter associated with the battery ID number has exceeded a battery recharge counter threshold associated with the battery ID number; in response to determining that the battery recharge counter associated with the battery ID number has not exceeded the battery recharge counter threshold associated with the battery ID number: increment the battery recharge counter associated with the battery ID number and enable the operation of the battery-powered device; and in response to determining that the battery recharge counter associated with the battery ID number exceeds the recharge counter threshold associated with the battery ID number disable the operation of the battery-powered device.

Example 14

The system of any of examples 8-13, wherein the operational component comprises a motor.

Example 15

The system of example 14, wherein the motor drives one or more of a screwdriver, a chainsaw, a circular saw, an air compressor, a drill, an orbital sander and a belt sander.

Example 16

The system of any of examples 8-15, wherein the operational component comprises one or more of an FM radio, a flashlight, a compact disc player, a camera and portable computer.

Example 17

The system of any of examples 8-16, wherein the at least one processor includes a data storage device.

Example 18

The system of any of examples 8-17, wherein the at least one processor is communicatively coupled to a data storage device external to the at least one processor.

Various embodiments of the disclosure have been described. These and other embodiments are within the scope of the following claims.

The invention claimed is:

1. A method comprising:
   sending, by a processor of a battery-powered device, an inquiry message to a removable battery pack coupled to the battery-powered device, wherein the removable battery pack comprises at least one authentication component;
   waiting, by the processor, for a predetermined time to receive a reply from the at least one authentication component of the battery pack, wherein the predetermined time provides for the reply to use a variety of authentication protocols;
   in response to receiving the reply from the at least one authentication component, determining, by the processor, whether the reply from the at least one authentication component is a valid reply;
   in response to determining, by the processor, that the reply from the at least one authentication component is a valid reply, enabling, by the processor, the battery-powered device;
   in response to determining, by the processor, that the reply from the at least one authentication component is an invalid reply, determining, by the processor, that the battery pack is an invalid battery pack, wherein an invalid battery pack includes a battery pack that has usable life remaining;
   in response to determining that the battery pack is an invalid battery pack, determining, by the processor, whether a phase-out period for the removable battery pack has expired, wherein during the phase-out period the processor is configured to allow the battery-powered device to use the invalid battery pack; and
   in response to determining that the phase-out period for the removable battery pack has expired, disabling, by the processor, the battery-powered device.

2. The method of claim 1, wherein the invalid reply includes no reply from the at least one authentication component.

3. The method of claim 1, wherein determining, by the processor, that the reply from the at least one authentication component is a valid reply comprises determining the at least one authentication component replies using a valid authentication key.

4. The method of claim 1, further comprising in response to determining that the phase-out period for the removable battery pack has not expired:
   determining, by the processor, whether the removable battery pack comprises at least one identification (ID) component, wherein the at least one ID component contains a battery ID number associated with the removable battery pack; and
   in response to determining that the removable battery pack does not have at least one ID component, disabling, by the processor, the battery-powered device.

5. The method of claim 4, further comprising in response to determining that the removable battery pack has at least one ID component:
   determining, by the processor, whether the battery ID number associated with the removable battery pack is a reused battery ID number, wherein determining whether the battery ID number associated with the removable battery pack is a reused battery ID number includes verifying the battery ID number against a plurality of battery ID numbers in a database stored at a data storage device communicatively coupled to the processor;
   in response to determining, by the processor, that the battery ID number is not a reused battery ID number:
      recording, by the processor, the battery ID number at the data storage device;
      associating, by the processor, a battery recharge counter to the battery ID number; and
      enabling, by the processor, the battery-powered device.

6. The method of claim 5, further comprising in response to determining that the battery ID number is a reused battery ID number:
   determining, by the processor, whether the battery recharge counter associated with the battery ID number has exceeded a battery recharge counter threshold associated with the battery ID number;
   in response to determining, by the processor, that the battery recharge counter associated with the battery ID number has not exceeded the battery recharge counter threshold associated with the battery ID number:
      incrementing, by the processor, the battery recharge counter associated with the battery ID number; and
      enabling, by the processor, of the battery-powered device; and
   in response to determining, by the processor, that the battery recharge counter associated with the battery ID number exceeds the recharge counter threshold associated with the battery ID number disabling, by the processor, the battery-powered device.

7. The method of claim 6, wherein the recharge counter threshold is zero and in response to determining, by the processor, that the battery recharge counter associated with the battery ID number has not reached the battery recharge counter threshold, decrease the battery recharge counter from a maximum number of recharge counts.

8. A system comprising,
   a battery-powered device, wherein the battery-powered device includes an operational component and at least one processor;
   a removable battery pack, wherein the removable battery pack includes at least one authentication component; and
   wherein the processor is configured to:
      send an inquiry message to the at least one authentication component of the battery pack;
      wait for a predetermined time to receive a reply from the at least one authentication component, wherein the predetermined time provides for the reply to use a variety of authentication protocols;
      in response to receiving the reply from the at least one authentication component, determine whether the reply is a valid reply;
      in response to determining that the reply is a valid reply, enable the battery-powered device;
      in response to determining that the reply from the at least one authentication component is an invalid reply, that the battery pack is an invalid battery pack, wherein an invalid battery pack includes a battery pack that has usable life remaining;
      in response to determining that the battery pack is an invalid battery pack, determining, by the processor, determine whether a phase-out period for the removable battery pack has expired, wherein during the phase-out period the processor is configured to allow the battery-powered device to use the invalid battery pack; and
      in response to determining that the phase-out period for the removable battery pack has expired disable the battery-powered device.

9. The system of claim 8, wherein the invalid reply includes no reply from the at least one authentication component.

10. The system of claim 8 wherein, determining, by the processor, that the reply from the at least one authentication component is a valid reply comprises determining the at least one authentication component replies using a valid authentication key.

11. The system of claim 8, wherein the processor is further configured to:
in response to determining that the phase-out period for the removable battery pack has not expired determine whether the removable battery pack comprises at least one identification (ID) component, wherein the at least one ID component contains a battery ID number associated with the removable battery pack; and
in response to determining that the removable battery pack does not have at least one ID component, disabling, by the processor, the battery-powered device.

12. The system of claim 11, wherein the processor is further configured to, in response to determining that the removable battery pack has at least one ID component:
determine whether the battery ID number associated with the removable battery pack is a reused battery ID number, wherein determining whether the battery ID number associated with the removable battery pack is a reused battery ID number includes verifying the battery ID number against a plurality of battery ID numbers in a database stored at a data storage device communicatively coupled to the processor;
in response to determining that the battery ID number is not a reused battery ID number:
record the battery ID number at the data storage device;
associate a battery recharge counter to the battery ID number; and
enable the battery-powered device.

13. The system of claim 12, wherein in response to determining that the battery ID number is a reused battery ID number, the processor is further configured to:
determine whether the battery recharge counter associated with the battery ID number has exceeded a battery recharge counter threshold associated with the battery ID number;
in response to determining that the battery recharge counter associated with the battery ID number has not exceeded the battery recharge counter threshold associated with the battery ID number:
increment the battery recharge counter associated with the battery ID number and enable the battery-powered device; and
in response to determining that the battery recharge counter associated with the battery ID number exceeds the recharge counter threshold associated with the battery ID number disable the battery-powered device.

14. The system of claim 8, wherein the operational component comprises a motor.

15. The system of claim 14, wherein the motor drives one or more of a screwdriver, a chainsaw, a circular saw, an air compressor, a drill, an orbital sander and a belt sander.

16. The system of claim 8, wherein the operational component comprises one or more of an FM radio, a flashlight, a compact disc player, a camera and portable computer.

17. The system of claim 8, wherein the at least one processor includes a data storage device.

18. The system of claim 8, wherein the at least one processor is communicatively coupled to a data storage device external to the at least one processor.

19. The system of claim 8, wherein the processor is a first processor and wherein the at least one authentication component comprises a second processor.

20. A battery-powered system comprising:
means for sending an inquiry message from a battery-powered device to a removable battery pack coupled to the battery-powered device, wherein the removable battery pack comprises at least one authentication component of the battery pack;
means for waiting for a predetermined time to receive a reply from the at least one authentication component, wherein the predetermined time provides for the reply to use a variety of authentication protocols;
in response to receiving the reply from the at least one authentication component, means for determining whether the reply from the at least one authentication component is a valid reply;
in response to determining that the reply from the at least one authentication component is a valid reply, means for enabling the battery-powered device;
in response to determining that the reply from the at least one authentication component is an invalid reply, wherein the invalid reply includes no reply from the at least one authentication component, means for determining that the battery pack is an invalid battery pack, wherein an invalid battery pack includes a battery pack that has usable life remaining;
in response to determining that the battery pack is an invalid battery pack, determining, by the processor, means for determining whether a phase-out period for the removable battery pack has expired, wherein during the phase-out period the battery-powered system is configured to allow the battery-powered device to use the invalid battery pack; and
in response to determining that the phase-out period for the removable battery pack has expired, means for disabling the battery-powered device.

21. The battery-powered system of claim 20 further comprising:
in response to determining that the phase-out period for the removable battery pack has not expired:
means for determining whether the removable battery pack comprises at least one identification (ID) component, wherein the at least one ID component contains a battery ID number associated with the removable battery pack; and
in response to determining that the removable battery pack does not have at least one ID component, means for disabling the battery-powered device;
in response to determining that the removable battery pack has at least one ID component, means for determining whether the battery ID number associated with the removable battery pack is a reused battery ID number, wherein the means for determining whether the battery ID number associated with the removable battery pack is a reused battery ID number includes means for verifying the battery ID number against a plurality of battery ID numbers in a database stored at a data storage device;
in response to determining that the battery ID number is not a reused battery ID number:
means for recording the battery ID number at the data storage device;

means for associating a battery recharge counter to the battery ID number;
means for enabling the battery-powered device;
in response to determining that the battery ID number is a reused battery ID number:
  means for determining whether the battery recharge counter associated with the battery ID number has exceeded a battery recharge counter threshold associated with the battery ID number;
  in response to determining that the battery recharge counter associated with the battery ID number has not exceeded the battery recharge counter threshold associated with the battery ID number:
    means for incrementing the battery recharge counter associated with the battery ID number; and
    means for enabling the operation of the battery-powered device; and
  in response to determining that the battery recharge counter associated with the battery ID number exceeds the recharge counter threshold associated with the battery ID number means for disabling the operation of the battery-powered device.

\* \* \* \* \*